US009070551B2

(12) United States Patent
Bowers et al.

(10) Patent No.: US 9,070,551 B2
(45) Date of Patent: Jun. 30, 2015

(54) METHOD AND APPARATUS FOR A DIFFUSION BRIDGED CELL LIBRARY

(71) Applicant: QUALCOMM Incorporated, San Diego, CA (US)

(72) Inventors: Benjamin John Bowers, Cary, NC (US); James W. Hayward, Raleigh, NC (US); Charanya Gopal, Raleigh, NC (US); Gregory Christopher Burda, Raleigh, NC (US); Robert J. Bucki, Raleigh, NC (US); Chock H. Gan, San Diego, CA (US); Giridhar Nallapati, San Diego, CA (US); Matthew D. Youngblood, Raleigh, NC (US); William R. Flederbach, Holly Springs, NC (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/974,135

(22) Filed: Aug. 23, 2013

(65) Prior Publication Data
US 2014/0367760 A1 Dec. 18, 2014

Related U.S. Application Data

(60) Provisional application No. 61/836,309, filed on Jun. 18, 2013.

(51) Int. Cl.
*G06F 17/50* (2006.01)
*H01L 27/02* (2006.01)
(Continued)

(52) U.S. Cl.
CPC ........ *H01L 27/0207* (2013.01); *G06F 17/5081* (2013.01); *G06F 2217/12* (2013.01);
(Continued)

(58) Field of Classification Search
USPC .................................. 257/206–208, 48, 204
IPC ..................................... H01L 27/092,27/11807
See application file for complete search history.

(56) References Cited

U.S. PATENT DOCUMENTS 5,633,185 A 5/1997 Yiu et al.
6,441,469 B1 8/2002 Chrysostomides et al.
(Continued)

FOREIGN PATENT DOCUMENTS

JP 2006073696 A 3/2006
WO 2009055113 A1 4/2009

OTHER PUBLICATIONS

International Search Report and Written Opinion—PCT/US2014/042719—ISA/EPO—Sep. 22, 2014.

*Primary Examiner* — Eugene Lee
(74) *Attorney, Agent, or Firm* — Muncy, Geissler, Olds & Lowe, P.C.

(57) ABSTRACT

A library of cells for designing an integrated circuit, the library comprises continuous diffusion compatible (CDC) cells. A CDC cell includes a p-doped diffusion region electrically connected to a supply rail and continuous from the left edge to the right edge of the CDC cell; a first polysilicon gate disposed above the p-doped diffusion region and electrically connected to the p-doped diffusion region; an n-doped diffusion region electrically connected to a ground rail and continuous from the left edge to the right edge; a second polysilicon gate disposed above the n-doped diffusion region and electrically connected to the n-doped diffusion region; a left floating polysilicon gate disposed over the p-doped and n-doped diffusion regions and proximal to the left edge; and a right floating polysilicon gate disposed over the p-doped and n-doped diffusion regions and proximal to the right edge.

7 Claims, 7 Drawing Sheets

(51) Int. Cl.
*H01L 21/22* (2006.01)
*H01L 27/092* (2006.01)
*H01L 27/118* (2006.01)

(52) U.S. Cl.
CPC ............ *G06F17/5072* (2013.01); *H01L 21/22* (2013.01); *H01L 27/092* (2013.01); *H01L 27/11807* (2013.01)

(56) References Cited

U.S. PATENT DOCUMENTS

| | | | |
|---|---|---|---|
| 6,674,119 B2 | 1/2004 | Hashimoto et al. | |
| 6,756,242 B1 | 6/2004 | Regan | |
| 7,474,107 B2 * | 1/2009 | Patterson et al. | 324/754.23 |
| 7,515,468 B2 | 4/2009 | Seo et al. | |
| 7,538,368 B2 * | 5/2009 | Yano | 257/202 |
| 7,679,083 B2 * | 3/2010 | Sun et al. | 257/48 |
| 7,834,388 B2 | 11/2010 | Yu et al. | |
| 7,919,792 B2 * | 4/2011 | Law et al. | 257/206 |
| 8,299,463 B2 * | 10/2012 | Xiao | 257/48 |
| 8,299,512 B2 | 10/2012 | Inagaki et al. | |
| 8,314,635 B2 * | 11/2012 | Law et al. | 326/41 |
| 8,329,480 B2 * | 12/2012 | Hung et al. | 438/18 |
| 8,782,576 B1 | 7/2014 | Bowers et al. | |
| 2005/0216873 A1 | 9/2005 | Singh et al. | |
| 2007/0240082 A1 | 10/2007 | Davis et al. | |
| 2009/0064072 A1 | 3/2009 | Lin et al. | |
| 2012/0299065 A1 | 11/2012 | Shimizu | |

* cited by examiner

METHOD AND APPARATUS FOR A DIFFUSION BRIDGED CELL LIBRARY

CLAIM OF PRIORITY UNDER 35 U.S.C. §119

The present Application for Patent claims the benefit of U.S. Provisional Application No. 61/836,309, entitled "METHOD AND APPARATUS FOR A DIFFUSION BRIDGED CELL LIBRARY" filed Jun. 18, 2013, assigned to the assignee hereof, and expressly incorporated herein by reference.

FIELD OF DISCLOSURE

Embodiments of the present invention relate to design of integrated circuits.

BACKGROUND

In modern process technologies, transistor performance is highly dependent on the length of diffusion (LOD) past the transistor gate. This dependency may be caused by stress differences in the diffused region, depending on distance to shallow trench isolation (STI), and differences in localized heating between STI and diffused areas during flash annealing, to name just a couple of examples.

In many modern CMOS logic cell libraries, the diffusion is typically laid out in two rows: one row for P-type pMOSFETs (Metal Oxide Semiconductor Field Effect Transistor), and another row for nMOSFETs. Typical logic cell libraries break the diffusion at each cell's edge (border) in order to electrically isolate the transistors inside the cell from neighboring cells. Additionally, there are restrictions on the polysilicon (or metal-gate) layers that enforce a fixed patterning for the layer. These polysilicon patterning rules are such that typical logic cell layouts have a dummy polysilicon feature at a cell edge.

In other types of cell libraries, known as gate-array, a uniform diffusion and polysilicon pattern is used. In some forms of gate-array, the diffused area is not broken at the cell edge, but instead uses MOSFETs that are turned to electrically isolate logically non-equivalent nodes. One byproduct of these cell architectures is that the diffusion sizes (and thus MOSFET widths) are similar for all logic circuits that comprise the basic template of the gate array.

SUMMARY

Embodiments of the invention are directed to systems and methods for a diffusion bridged cell library.

Because transistor performance is highly influenced by breaks in the diffusion area, embodiments provide a cell architecture that is expected to maximize the benefit of the LOD effects so as to influence performance or leakage power.

In an embodiment, an integrated circuit includes a cell having a p-doped diffusion region contained in the cell and continuous from its left edge to its right edge, where the p-doped diffusion region is electrically connected to a supply rail. The cell further includes a first polysilicon gate disposed above, i.e. created in a later fabrication step, the p-doped diffusion region and electrically connected to the supply rail; an n-doped diffusion region contained in the cell and continuous from the left edge to the right edge, and electrically connected to the ground rail; a second polysilicon gate disposed above the n-doped diffusion region and electrically connected to the ground rail; a left floating polysilicon gate disposed over the p-doped and n-doped diffusion regions and proximal to the left edge; and a right floating polysilicon gate disposed over, i.e. created in a later fabrication step, the p-doped and n-doped diffusion regions and proximal to the right edge.

In another embodiment, a method bridges together cells in an integrated circuit. The method includes adding a marker layer to each edge of a cell; for each marker shape touching two diffusion edges, growing a shortest diffusion edge of the two diffusion edges touched by the each marker shape, wherein the growth is a width of the each marker shape; applying a Boolean AND to grown diffusion edges and marker shapes to define new diffusion regions; growing each new diffusion region to have a polysilicon pitch of the integrated circuit; and growing each floating gate proximal to a grown new diffusion region.

In another embodiment, a method bridges together cells in an integrated circuit. The method includes, during post placement of cells in a design, inserting continuous diffusion compatible (CDC) filler cells in the design; grouping and ordering cells on a placement row to form a list of cells; traversing the list of cells in order, wherein if a cell in the list of cells is a CDC cell and a neighboring cell of the cell is a CDC cell, the cell and its neighboring cell each comprising diffusion regions, then creating a bridge cell at an edge of the cell to overlap the cell and its neighboring cell so as to electrically connect together the diffusion regions of the cell and its neighboring cell.

In another embodiment, a method generates filler cells in an integrated circuit. The method includes adding a first set of placement constraints in a design, the first set of placement constraints to enforce minimum spacing between continuous diffusion compatible (CDC) cells and non-CDC cells; selecting and inserting end cap cells to terminate voids between CDC and non-CDC cells in the design due to the minimum spacing; and creating filler cells where there are placement voids between CDC cells on a placement row in the design.

In another embodiment, a method de-tunes cells in an integrated circuit. The method includes generating a bridged timing model for a design comprising bridging cells or end cap cells; generating an un-bridged timing model for the design in which bridging cells or end cap cells are removed; performing a static timing analysis with the bridged timing model; and for each cell in a fast-path in the design, determining the cells neighboring the each cell, and if both neighboring cells are not setup critical within some margin, then any bridging cells neighboring the cell are removed from the design.

In another embodiment, an integrated circuit includes means for providing a supply voltage; means for providing a ground voltage; and a cell. The cell includes a p-doped diffusion region contained in the cell and continuous from its left edge to its right edge, and electrically connected to the means for providing a supply voltage; a first polysilicon gate disposed above the p-doped diffusion region and electrically connected to the means for providing a supply voltage; an n-doped diffusion region contained in the cell and continuous from the left edge to the right edge, and electrically connected to the means for providing a ground voltage; a second polysilicon gate disposed above the n-doped diffusion region and electrically connected to the means for providing a ground voltage; a left floating polysilicon gate disposed over the p-doped and n-doped diffusion regions and proximal to the left edge; and a right floating polysilicon gate disposed over the p-doped and n-doped diffusion regions and proximal to the right edge.

In another embodiment, a method bridges together cells in an integrated circuit. The method includes adding a marker layer to each edge of a cell; means for growing, the means for growing to grow a shortest diffusion edge of two diffusion edges both touched by a marker shape, wherein the means for growing grows the shortest diffusion edge to have a width of the marker shape; means for defining new diffusion regions, the means for defining new diffusion regions to apply a Boolean AND to grown diffusion edges and marker shapes to define new diffusion regions; growing each new diffusion region to have a polysilicon pitch of the integrated circuit; and growing each floating gate proximal to a grown new diffusion region.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
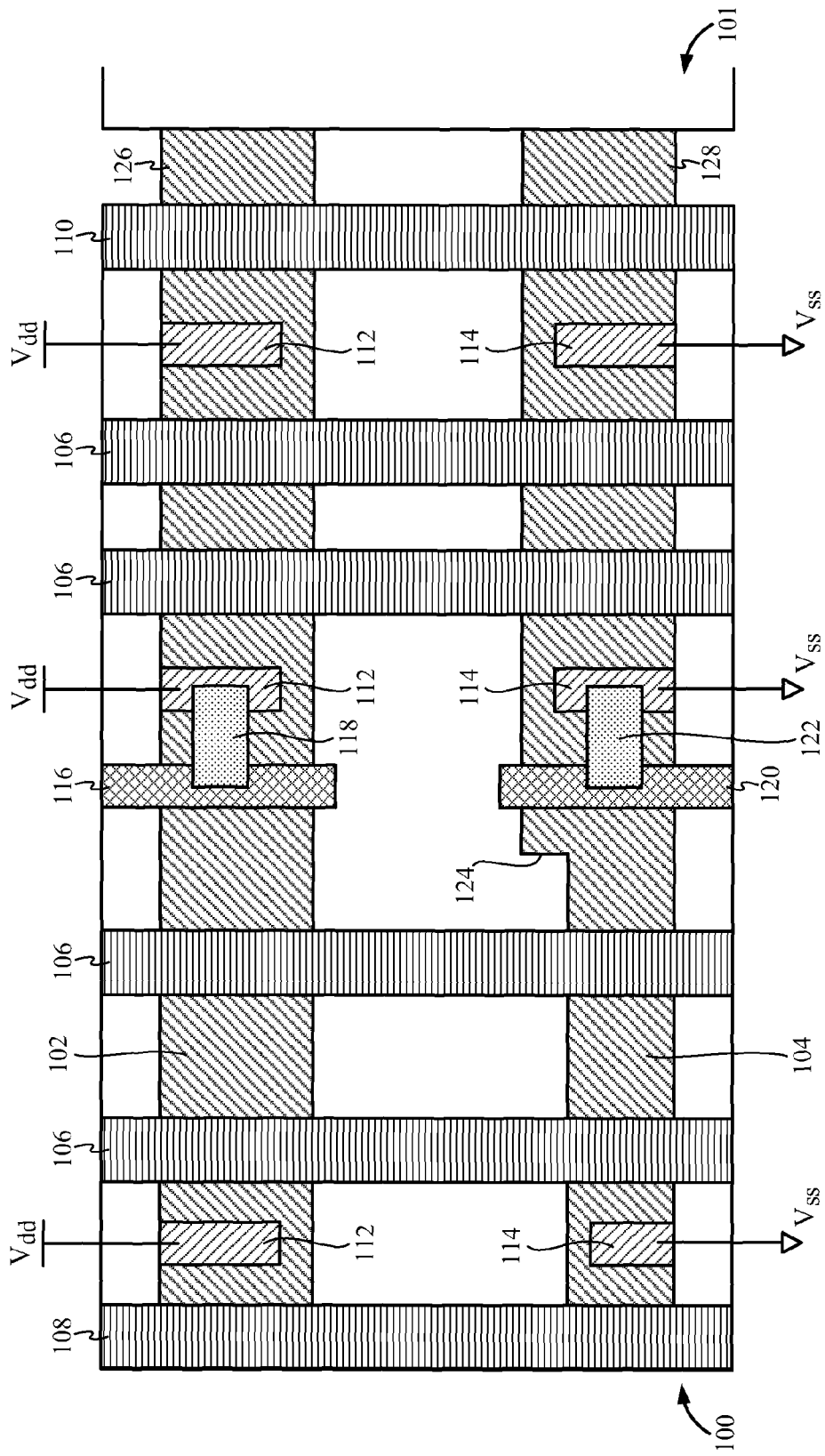
FIG. 1 illustrates a cell layout according to an embodiment.

Embodiments are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that specific circuits (e.g., application specific integrated circuits (ASICs)), one or more processors executing program instructions, or a combination of both, may perform the various actions described herein. Additionally, the sequences of actions described herein can be considered to be embodied entirely within any form of a non-transitory, computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments may provide cell library architectures with some or all of the following features described below. It is expected that such features improve performance for a given process technology that exhibits enhanced device performance for increased LOD.

Embodiments may provide a cell library architecture in which a cell has continuous diffusion regions. Furthermore, embodiments may provide a method for bridging together cells, where some or all such cells have continuous diffusion regions according to the cell library architecture.

Embodiments may provide a cell layout comprising one or more continuous diffusion regions across the cell, where each diffusion region is fully self-contained inside the cell. Embodiments also provide for a cell comprising one or more transistors tied in an OFF configuration, where the gate for a pMOSFET is at Vdd and the gate for an nMOSFET is at Vss. This feature helps to electrically isolate signal and supply nodes, while preserving a continuous diffusion profile for the cell. Such tied transistors are used instead of a STI to isolate electrically separated diffusion regions.

Embodiments may provide a cell comprising a polysilicon contact on top of a transistor gate. This feature allows the transistor's gate to be tied in a manner that does not reduce the width of the transistors on or around the tied transistor. An embodiment cell also may have the feature whereby the left and right edge portions of the diffusion regions are electrically connected to the supply or ground rail. As will be discussed later, this feature facilitates in bridging cells together without shorting a signal line to a supply or ground rail, or shorting a signal line to another signal line.

Embodiments may provide a cell comprising floating polysilicon stripes at the left or right edges for patterning purposes. The cell library architecture itself does not contain diffusion regions at a cell edge. After instantiation, a floating polysilicon stripe is converted to a floating transistor using a post-processing algorithm, which may be termed bridging.

Embodiments may provide a cell library with a limited set of diffusion edge profiles at the left and right boundaries. For example, in a particular embodiment, the pMOSFETs and nMOSFETs are each allowed one of two device sizes and a single offset. Thus, for an arbitrary single row of cells with a left edge and right edge, the number of diffusion edge profiles are 2 (for a pMOSFET or a nMOSFET) times 2 (two diffusion heights) times 2 (for either left or right), yielding 8 different profile types for a given cell.

Embodiments may provide a cell library that includes an encoding to represent the cell's diffusion edge profile, which is stored as a cell name or attribute on the cell.

Such a cell with one or more of the above features may be referred to as a continuous diffusion compatible cell. With these features, the floating polysilicon at a cell edge may be converted to a floating-gate MOSFET of a particular device width and length.

Because the cell library includes continuous diffusion regions internal to the cell, but is constructed to be continuous diffusion compatible (CDC), a technique referred to as bridging may be used to enable continuous diffusion between cells. The purpose of bridging is to connect two cells that are CDC. This is important in achieving the expected performance.

FIG. 1 illustrates the layout of a cell 100 according to an embodiment. The p-doped diffusion region is labeled 102 and the n-doped diffusion region is labeled 104. The diffusion regions 102 and 104 are continuous across the width of the cell. In practice, the p-doped diffusion region 102 is formed in an n-well, but for simplicity the n-well is not shown.

The polysilicon layers for forming the gates are each labeled 106. A left polysilicon layer, labeled 108, and a right polysilicon layer, labeled 110, are each floating for the purpose of bridging together cells. For ease of illustration, dielectric layers underneath the polysilicon layers are not shown. As discussed later in this description, diffusion is grown to bridge cells together, where in FIG. 1 p-doped and n-doped grown diffusion regions for bridging are labeled as 126 and 128, respectively, and the other cell bridged to the cell 100 is labeled as 101. The cell 101 may be an end cap cell or bridging cell, which is discussed later.

Local interconnect layers 112 are formed in the p-doped region 102 so that the p-doped region is connected to the supply voltage Vdd. The local interconnect layers 114 are formed in the n-doped region 104 so that the n-doped region 104 is connected to the substrate (or ground) voltage Vss. If electrical isolation is desired for portions of the p-doped diffusion region 102, a polysilicon layer, labeled 116, above the p-doped diffusion layer 102, is connected to one of the local interconnect layers 112 by way of an interconnect 118 to provide a pMOSFET turned OFF. The polysilicon layer 116 serves as the gate of the pMOSFET, and is formed above a dielectric layer. The dielectric layer is formed above the p-doped region 102, but is not shown for ease of illustration.

Similarly, if electrical isolation is desired for portions of the n-doped diffusion region 104, a polysilicon layer, labeled 120, above the n-doped diffusion layer 104, is connected to one of the local interconnect layers 114 by way of an interconnect 122 to provide a nMOSFET turned OFF. The polysilicon layer 120 serves as the gate of the nMOSFET, and is formed above a dielectric layer. The dielectric layer is formed above the n-doped region 104, but is not shown for ease of illustration.

Note that the profile of a diffusion region may vary along a cell. For example, the numerical label 124 indicates a transition region in the profile (height) for the n-doped diffusion region 104.

Embodiments may include a bridging step to create new diffusion regions on a floating polysilicon layer at a cell edge that is dependent on the width of diffusion regions in neighboring cells. In the design or layout process, these new diffusion regions may be over or under their respective floating polysilicon layers. Before fabrication, each layer is merged and processed independently and sequenced appropriately in a fabrication line. Depending on the actual fabrication process, e.g., gate-first or gate-last, such a newly created diffusion region during a bridging step may be processed before or after its respective floating polysilicon layer. Accordingly, it is immaterial whether an embodiment treats a new diffusion region in a bridging step as over or under its respective floating polysilicon layer, and referring to a newly created diffusion region as "on" its respective floating polysilicon layer is to be interpreted to mean that it may be under or over the floating polysilicon layer during the design or layout process.

Adding such new diffusion regions may create a floating gate parasitic device at a cell edge. If two neighboring device polysilicon features are not equivalent, additional polysilicon shapes may be added to reduce polysilicon feature variation, or perhaps may be added to satisfy layout design rules. A marker layer may be annotated on a floating gate device to prevent the device from being subject to LVS (layout versus schematic) checking.

The bridging method may be handled in various ways. One approach may be termed a geometric bridging method. In this approach, a marker layer is added at the left or right (or both) edges of all CDC cells in a layout. In post placement, CDC filler cells are inserted where needed. A geometric (shapes-based) processing routine may be used to bridge from cell to cell in a design rule checking (DRC) correct manner. In particular, new diffusion regions may be created, and the length of the floating-gate at the cell edge may be grown where new diffusion regions are created.

Figure 2:
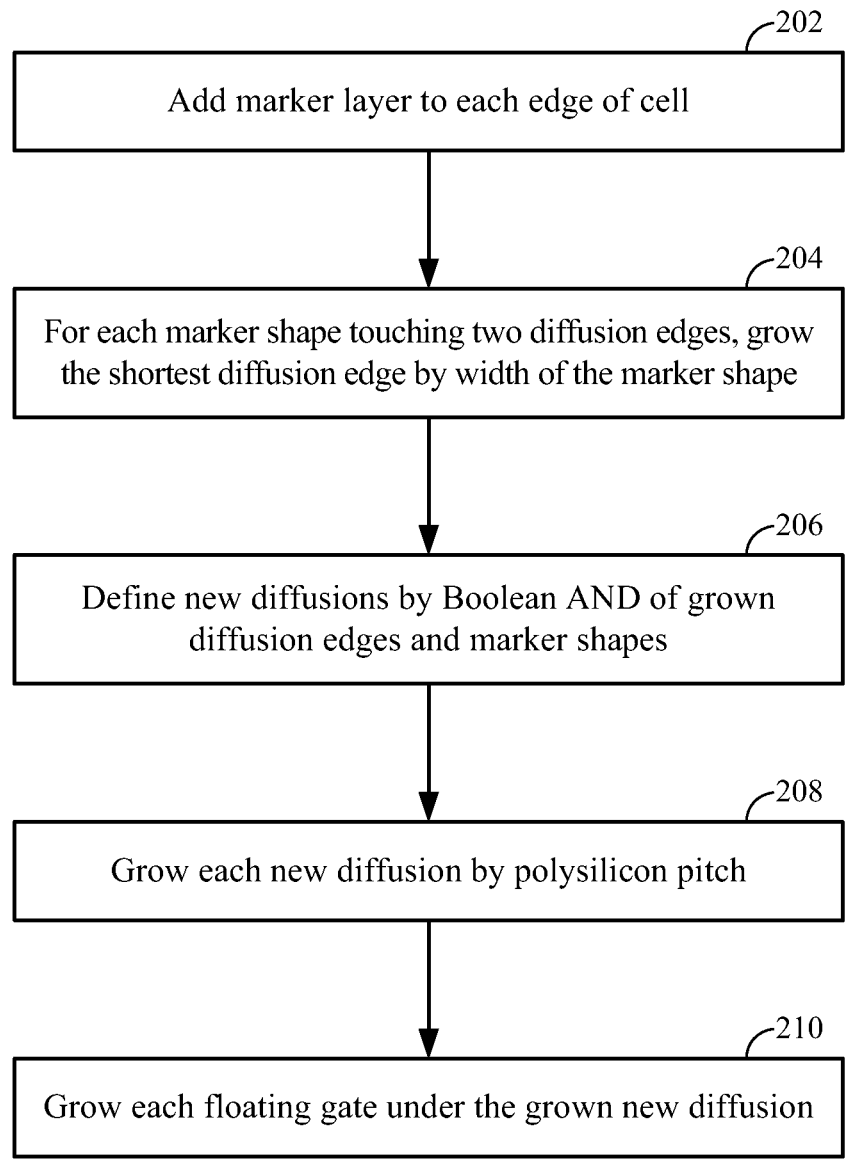
FIG. 2 illustrates a method for forming continuous diffusion regions according to an embodiment.

An example is illustrated in the flow diagram of FIG. 2. A marker layer is added to each floating gate at a cell edge (202). For each marker shape touching two diffusion edges, grow the shortest diffusion edge by the width of its corresponding marker shape (204). New diffusion regions are defined by the Boolean (logical) operator AND applied to each pair of a grown diffusion edge and its corresponding marker shape (206). Each new diffusion is grown at the polysilicon pitch (208). Grow each floating gate under a grown new diffusion based upon the widths of polysilicon lines touching the grown new diffusion (210).

Figure 3:
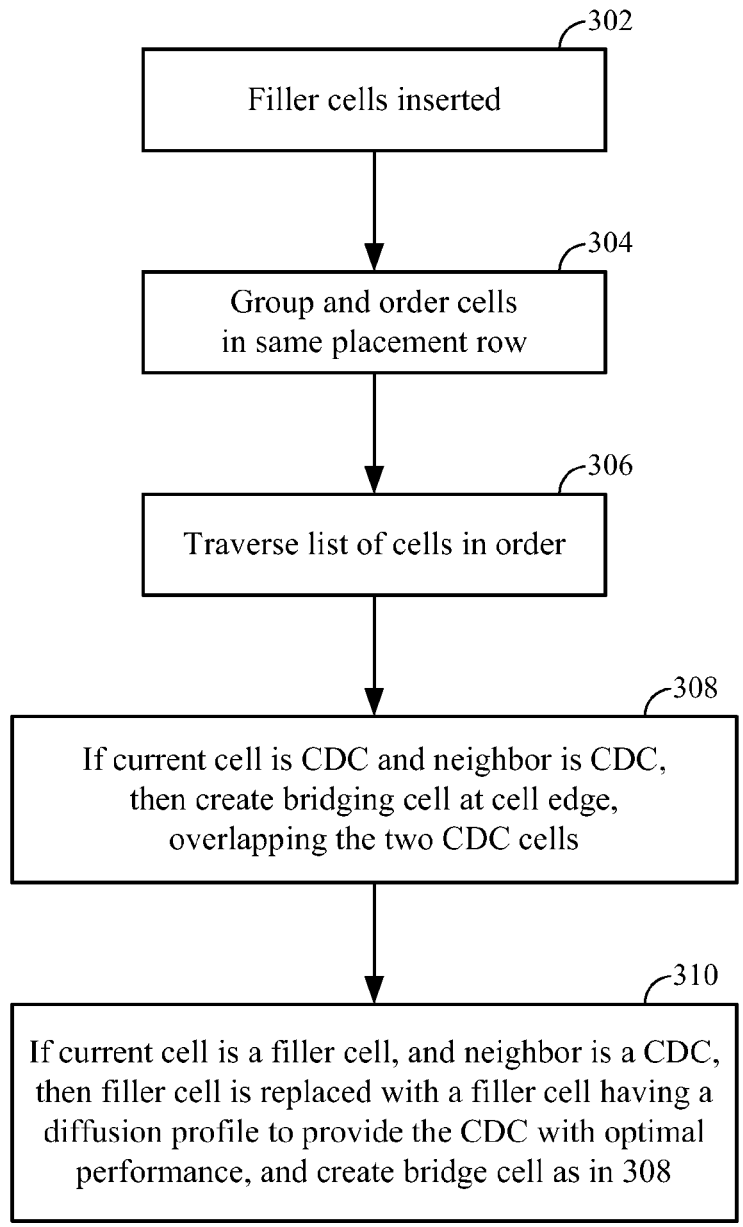
FIG. 3 illustrates a method for forming bridging cells according to an embodiment.

Another embodiment, which may be termed a row-based bridging method, is illustrated in FIG. 3. During post placement, CDC filler cells are inserted (302). Cells on the same placement row are grouped together and ordered, for example from left to right (304). Traversing the list of cells in order: 1) if the current cell is a CDC cell and its neighboring cell is a CDC cell, then a bridge cell is created at the cell edge, overlapping the two cells in order to connect the diffusion regions and to correct design rule errors on base layers that may arise from differences in the diffusion edge profiles; or 2) if the current cell is a filler cell, and the neighboring cell is a CDC cell, then the filler cell is replaced with a filler cell having a diffusion profile that provides the neighboring CDC cell with improved or optimal performance, and also a bridge cell is created at the cell edge as described above.

Embodiments also provide a method for intermixing continuous and non-continuous diffusion library cells, or heterogeneous continuous-diffusion library cells. Although continuous diffusion across a cell may increase performance, there may be an area penalty or circuit restrictions (due to library architecture required for continuous diffusion that makes traditional architecture library cells useful for certain circuits. In order to have maximum flexibility in a logic netlist, a combination of continuous diffusion and non-continuous diffusion cells is often desired.

Although at first thought it may appear that using CDC and non-CDC cells together is not optimum, we note that it is important to bridge together CDC cells so that the LOD effects provide improved or optimal performance. Mixing in non-CDC cells will necessitate breaks in the diffusion, which are undesirable, as they will impact LOD of neighboring CDC cells. In order to mitigate performance degradation of bridged CDC cells, it is suggested to terminate the continuous diffusion regions to ensure appropriate performance of these bridged CDC cells. When terminating groups of CDC cells, a terminating (end-cap) dummy cell should be used to provide an LOD that guarantees appropriate performance for the bridged CDC cells in the group.

Figure 4:
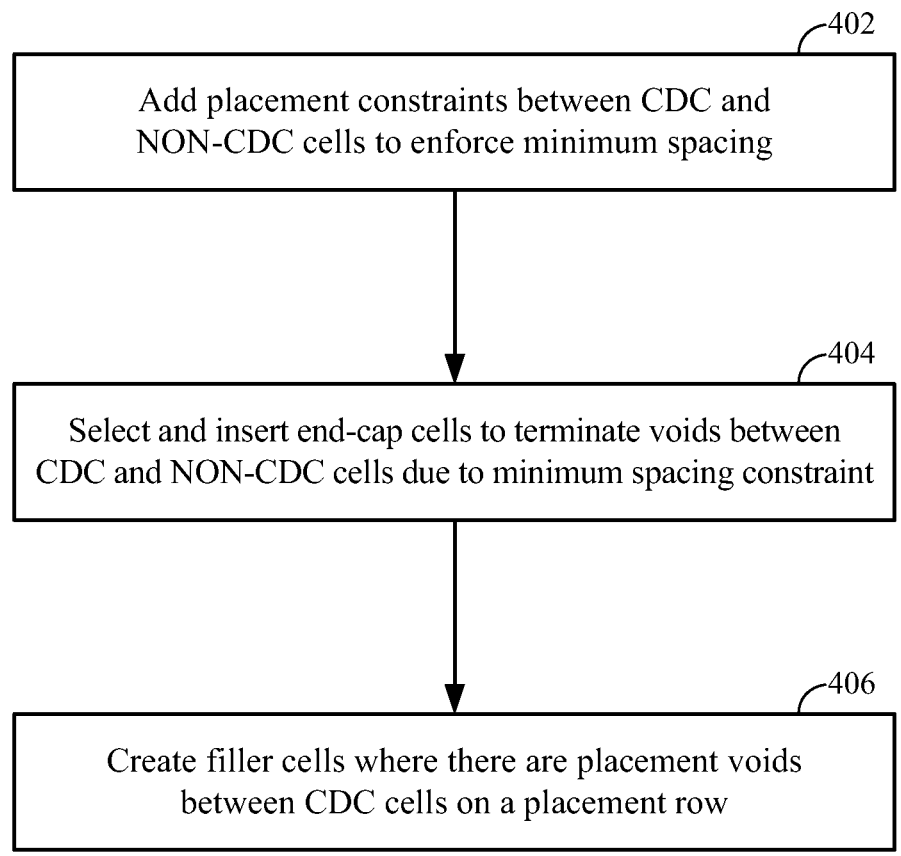
FIG. 4 illustrates a method for forming end cap and filler cells according to an embodiment.

FIG. 4 illustrates a method for mixing CDC library cells with non-CDC library cells. The method adds a placement constraint between two cell types to enforce a minimum spacing between CDC and non-CDC library cells (402). End cap cells are selected and inserted to terminate the void between CDC and non-CDC cells caused by the above minimum spacing constraint (404). The method creates filler cells between regions where there are placement voids between CDC cells on a placement row (406).

Furthermore, the selection and insertion of these cells according to the embodiment of FIG. 4 may be chosen to maximize performance of neighboring cells (parametric frequency improvement) by choosing filler and end-cap cells that provide the optimal LOD for the neighboring cell based off a pre-computed table of known good LOD conditions.

Figure 5:
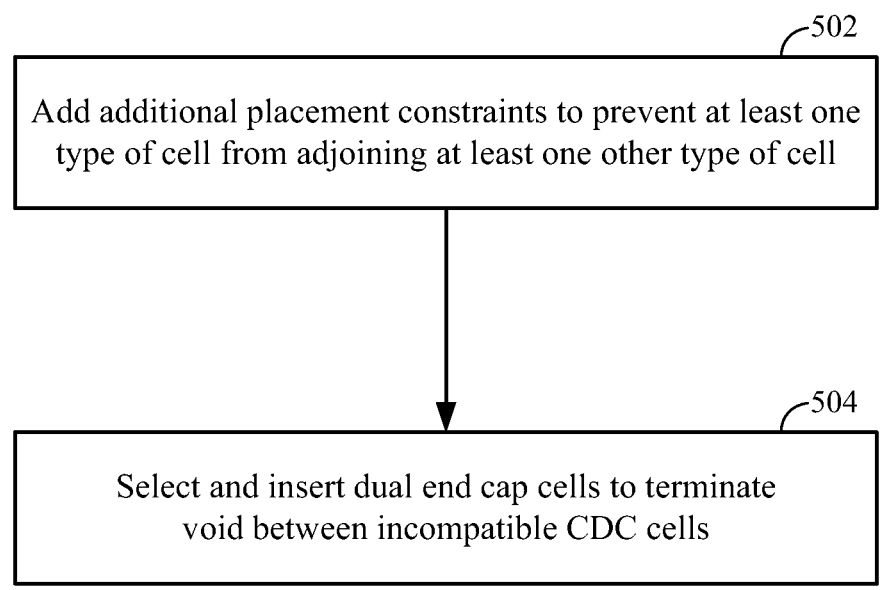
FIG. 5 illustrates a method for forming dual end cap cells according to an embodiment.

FIG. 5 illustrates a method for mixing incompatible continuous-diffusion library cells. Step 502 indicates that additional placement proximity constraints are utilized to prevent some types of CDC cells from adjoining other types of CDC cells. This may occur when the diffusion edge profiles for two continuous diffusion cells are incompatible due to design rule restrictions. As an example, suppose there are three diffusion edge profiles denoted as A, B, and C, with design rules: A may touch A or B; B may touch A, B, or C; and C may touch B or C. For this particular set of design rules, a placement restriction should be defined to enforce a minimum spacing between A and C.

Dual end cap cells are selected and inserted to terminate the void between incompatible continuous diffusion cells (504). A dual end cap cell is a cell that terminates two different types of incompatible CDC cells. Referring to the above example and method, cell types A and C are placed with a separation constraint of four tracks, where a track is a set of discretized placement positions on a standard cell row, usually having a pitch corresponding to the poly pitch. A dual end cap cell of type "A-C" that terminates diffusion edge profiles for the A and C cell types is inserted between the cells A and C.

Alternatively, two individual end-cap cells may be inserted instead of a dual-end-cap cell. Encoded diffusion edge profile may be stored by cell name or attribute to select the appropriate filler cell, end-cap cell, or dual-end-cap cell for optimal cell performance.

One drawback to applying performance enhancing LOD approaches is that it may result in increased off-current for the transistors. This leads to increased leakage power, as compared to non-continuous diffusion approaches. Ideally, one would prefer to employ continuous diffusion where required for performance, and non-continuous where leakage power is more important. Accordingly, other embodiments provide a method for reducing leakage power by selectively converting continuous diffusion cells to non-continuous diffusion cells.

During the synthesis and placement portion of a typical design flow, a technique of mixing may be employed to select between continuous and non-continuous diffusion cells. However, at the end of the design flow it may be preferable to make in-place cell swaps to de-tune non-critical paths in order to reduce leakage power. Additionally, there may be fast-paths in a design that may cause race-conditions. In these cases it also may be desirable to convert continuous diffusion cells to non-continuous diffusion cells in order to prevent races and increase hold-time margin.

When using a CDC cell architecture, an embodiment methodology may be used to de-tune devices in-place to reduce leakage or reduce race-through by selective removal of bridging cells. Note that deciding which bridges to remove is not straightforward, as removal of a bridging cell may negatively affect the cell on both the left and right of the bridging cell.

Figure 6:
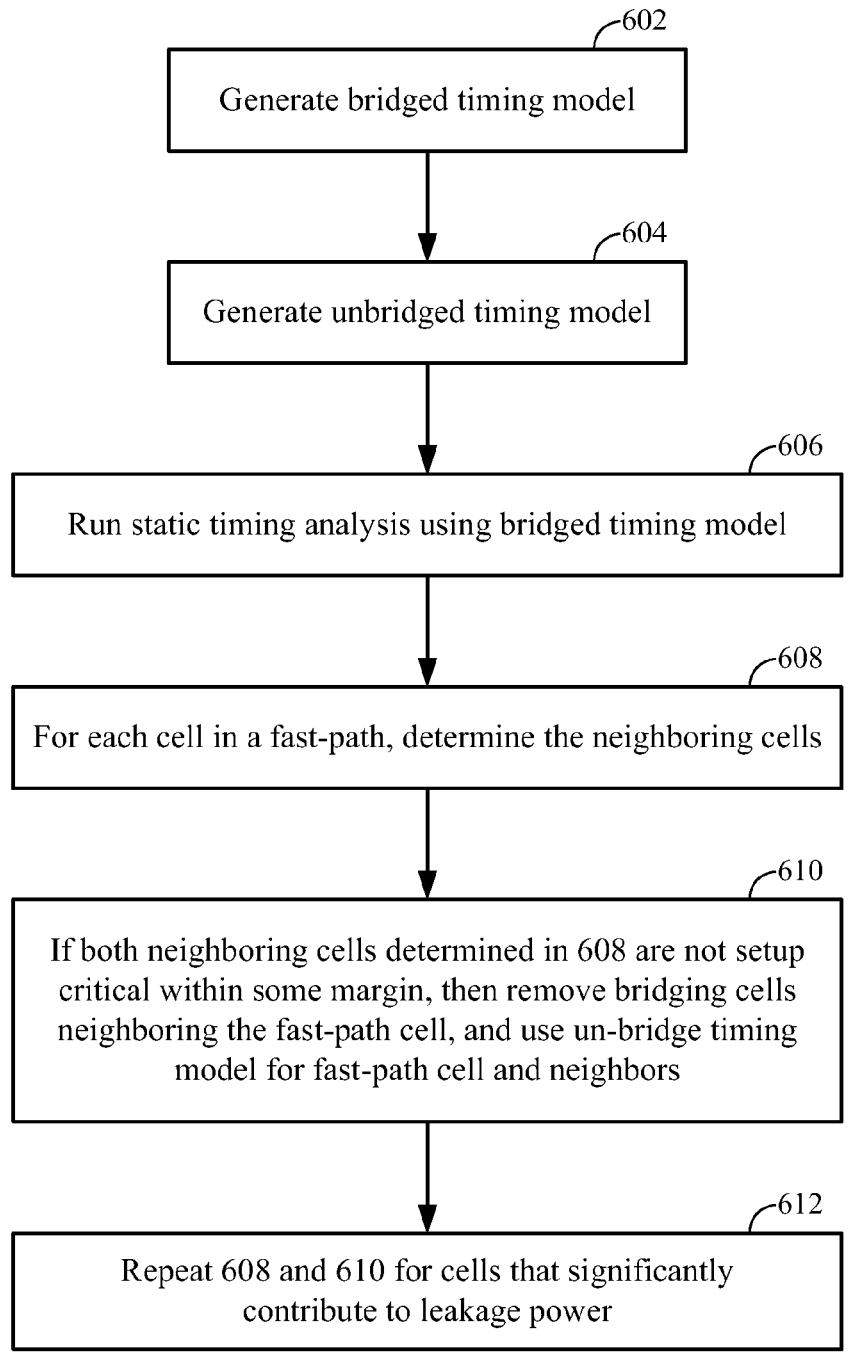
FIG. 6 illustrates a method for de-tuning a fast path according to an embodiment.

FIG. 6 illustrates a flow diagram for the above-described method. In step 602, a timing model is generated based on characterizing the CDC library, assuming LOD when the library is bridged to neighboring CDC cells or filler and/or end cap cells. This timing model may be termed a bridged or normal timing model. In step 604, a second timing model is generated based on characterizing the CDC library but with a different LOD condition than assumed in step 602, such that the bridges are removed. This timing model may be termed an un-bridged timing model. This should have generally lower leakage and be slower than the original characterization of step 602. In step 606, a static timing analysis is performed using the bridged timing model.

In step 608, for each cell in a fast-path in the design, the cells neighboring that cell (which may be termed a fast-path cell) are determined. In step 610, if both neighboring cells are not setup-critical within some margin, then the bridging cells neighboring the fast-path cell are removed, and the un-bridged timing model is used for the fast-path cell and both neighboring cells. Steps 608 and 610 are repeated for cells that significantly contribute to leakage power but are not setup-critical (step 612).

For the case of CDC cells that abut filler cells or end-cap cells on both the left or right side, the filler and end-cap cells do not need to be adjusted for timing and thus the above steps may be simplified.

To achieve additional accuracy and increase the potential for cell swaps, the above method may be extended to provide for four characterizations: bridged (normal) timing model; right un-bridged timing model; left un-bridged timing model; and both un-bridged timing model. This allows more granularity in that a cell that is bridged on both sides may be de-tuned by removing its left bridging cell only, its right bridging cell only, or both left and right bridging cells. For example, the previously described method may be amended to attempt removal of both bridging cells, but if timing of either the left or right side would violate setup time (plus margin), then the left or right un-bridged timing models should be selected to attempt simulation of removing only the left or right bridging cells.

Figure 7:
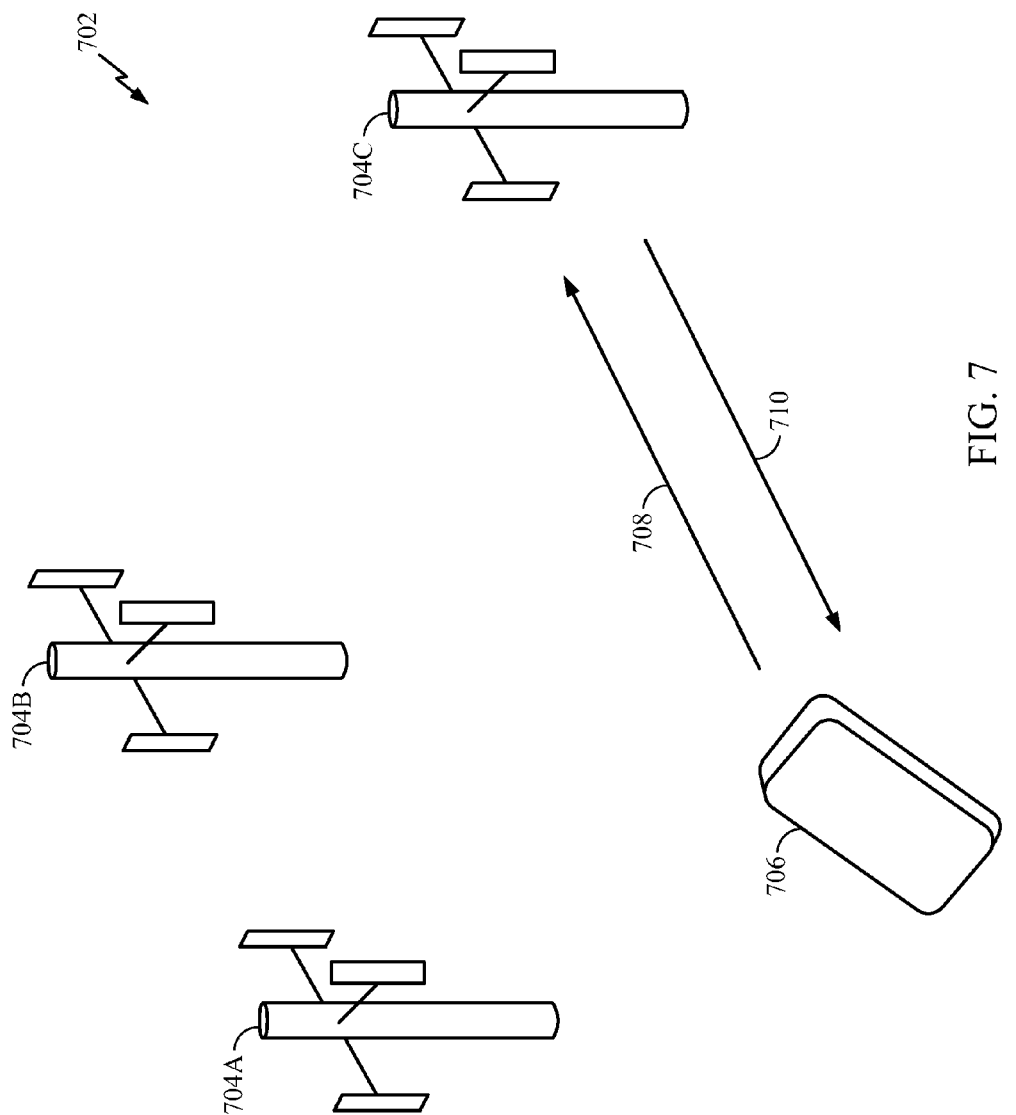
FIG. 7 illustrates a communication system in which embodiments may find application.

FIG. 7 illustrates a communication system in which embodiments may find application. FIG. 7 illustrates a wireless communication network 702 comprising base stations 704A, 704B, and 704C. FIG. 7 shows a communication device, labeled 706, which may be a mobile cellular communication device such as a so-called smart phone, a tablet, or some other kind of communication device suitable for a cellular phone network, such as a computer or computer system. The communication device 706 need not be mobile. In the particular example of FIG. 7, the communication device 706 is located within the cell associated with the base station 704C. Arrows 708 and 710 pictorially represent the uplink channel and the downlink channel, respectively, by which the communication device 706 communicates with the base station 704C.

Embodiments may be used in data processing systems associated with the communication device 706, or with the base station 704C, or both, for example. FIG. 7 illustrates only one application among many in which the embodiments described herein may be employed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a non-transitory computer readable media embodying a method for a diffusion bridged cell library. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus comprising an integrated circuit, the integrated circuit comprising:
   a supply rail;
   a ground rail; and
   a first cell, the first cell having a left edge and a right edge, the first cell comprising:
      a p-doped diffusion region contained in the first cell and continuous from the left edge to the right edge, the p-doped diffusion region electrically connected to the supply rail;
      a first polysilicon gate disposed above the p-doped diffusion region and electrically connected to the supply rail;
      an n-doped diffusion region contained in the first cell and continuous from the left edge to the right edge, the n-doped diffusion region electrically connected to the ground rail;
      a second polysilicon gate disposed above the n-doped diffusion region and electrically connected to the ground rail;
      a left floating polysilicon gate disposed over the p-doped diffusion region and n-doped diffusion region and proximal to the left edge; and
      a right floating polysilicon gate disposed over the p-doped diffusion region and n-doped diffusion region and proximal to the right edge.

2. The apparatus of claim 1, the integrated circuit further comprising:
   a second cell, the second cell having a left edge, the second cell comprising:
      a p-doped diffusion region;
      an n-doped diffusion region;
      a p-doped bridge diffusion region connecting together the p-doped diffusion regions of the first and the second cell; and
      an n-doped bridge diffusion region connecting together the n-doped diffusion region of the first and the n-doped diffusion region of the second cell.

3. The apparatus of claim 2, wherein the p-doped bridge diffusion region and the n-doped bridge diffusion region are each disposed below the right floating polysilicon gate.

4. The apparatus of claim 2, wherein the p-doped bridge diffusion region and the n-doped bridge diffusion region are each disposed below the left floating polysilicon gate.

5. The apparatus of claim 2, wherein the second cell further comprises a left floating polysilicon gate disposed over the p-doped diffusion region and the n-doped diffusion region of the second cell and proximal to the left edge of the second cell.

6. The apparatus of claim 5, the second cell having a right edge, wherein the p-doped diffusion region of the second cell is continuous from the left edge of the second cell to the right edge of the second cell, and wherein the n-doped diffusion region of the second cell is continuous from the left edge of the second cell to the right edge of the second cell.

7. The apparatus of claim 1, wherein the apparatus is selected from the group consisting of a phone, a tablet, a base station, and a computer system.

* * * * *